Dec. 18, 1951   M. L. CHANNELL   2,579,065
DRIP TRAY
Filed Sept. 13, 1949
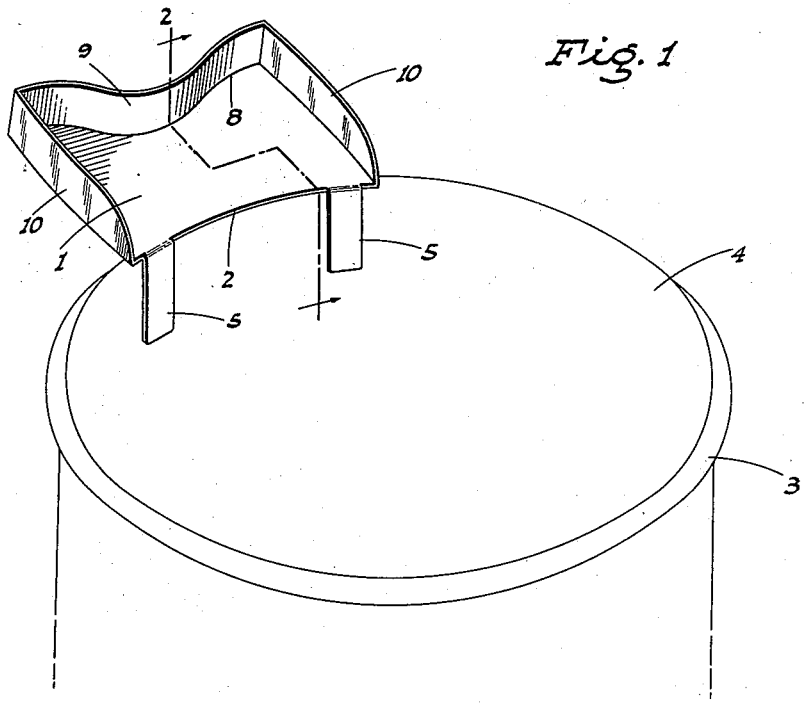
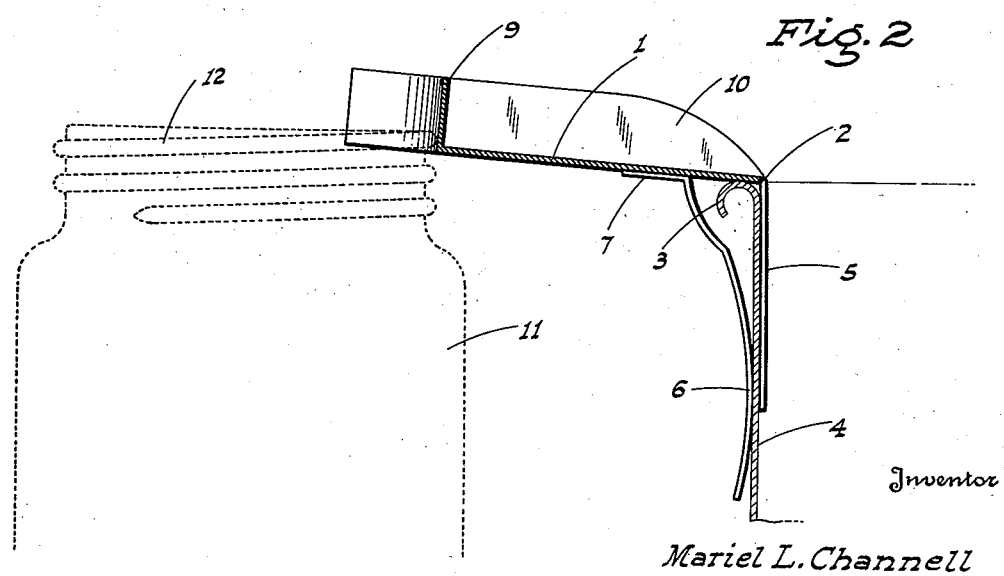
Inventor
Mariel L. Channell
By
ATTORNEYS

Patented Dec. 18, 1951

2,579,065

UNITED STATES PATENT OFFICE 2,579,065

DRIP TRAY

Mariel L. Channell, Fresno, Calif.

Application September 13, 1949, Serial No. 115,524

2 Claims. (Cl. 222—129)

This invention is directed to, and it is an object to provide, a novel drip tray adapted for use in connection with an open-top cooking vessel at the top thereof in laterally outwardly projecting relation; the purpose of the device being to catch drips which may occur upon cooked fruit, vegetables, or the like being transferred by a spoon or ladle from the cooking vessel to a preserving jar or similar container standing alongside said vessel.

Another object of the invention is to provide a drip tray, as above, which includes novel attaching means for frictionally and removably securing the tray in proper position on the cooking vessel.

An additional object of the present invention is to provide a drip tray which has relatively close matching relation to both the cooking vessel and the preserving jar; thus further assuring of any escape of cooked material onto the stove top or the like during preserving operations.

A further object of the invention is to provide a drip tray which, when detached from the cooking vessel, may be easily and conveniently washed and stored for subsequent use.

It is also an object of the invention to provide a drip tray designed for ease and economy of manufacture; the device being capable of stamping from metal or molding from plastic in an expeditious manner.

Still another object of the invention is to provide a practical and reliable drip tray, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the drip tray as attached to the upper end portion of a cooking vessel.

Fig. 2 is an enlarged sectional elevation of the drip tray taken on line 2—2 of Fig. 1, and showing the cooperation of said drip tray with the neck portion of an adjacent preserving jar.

Referring now more particularly to the characters of reference on the drawings, the device includes a bottom plate, indicated generally at 1, which bottom plate has an inner longitudinal edge 2 which is concave in generally matching relation to the rim 3 at the upper end of the cooking vessel 4 in connection with which the device is adapted to be used.

At said inner edge 2 the bottom plate 1 is formed, in spaced relation, with a pair of rigid depending attachment fingers 5 which are adapted to engage within the cooking vessel 4 when said bottom plate 1 rests adjacent the inner edge 2 on the rim 3.

A leaf spring 6 is fixed to the under side of the bottom plate 1, as at 7, and depends in cooperative relation to each attachment finger 5.

The leaf springs 6 are formed so that they are loaded to an extent that when the attachment fingers 5 engage within the cooking vessel 4, said leaf springs 6 bear frictionally against the outside of said vessel whereby to thus effectively but removably maintain the bottom plate 1 in a position projecting radially outwardly from the rim 3; the fingers 5 and leaf springs 6 supporting said bottom plate at a slight downward incline toward the cooking vessel.

The outer edge 8 of the bottom plate 1 is formed with a central concave portion, and a flange 9 upstands from said edge 8 with a similar concavity therein. End flanges 10 upstand from opposite ends of the bottom plate 1 and merge with the flange 9 whereby to prevent any spillage off the bottom plate 1 at its ends or outer edge 8.

When the above described drip tray is in use it is placed on the cooking vessel 4 in the manner described and then a preserving jar 11 is placed alongside the cooking vessel with the neck 12 of said jar abutting, and lying within the confines of, the concavity of the flange 9.

The cooked material in the vessel 4 is then manually transferred by a spoon or ladle from said vessel 4 to the preserving jar 11; any drips which may occur falling onto the bottom plate 1 and either remaining there or flowing back into the cooking vessel.

In this manner the process of transferring cooked material from a cooking vessel to a preserving jar can be accomplished without spillage of such material onto the stove top, and consequently the operation is clean and no mess results.

After the operation is completed the device is manually detached from the cooking vessel, washed, and stored.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A drip tray comprising a generally rectangular bottom plate, a spring clip unit mounted on and depending from the plate to engage over the vertical wall of and support the tray from a cooking vessel, the unit being arranged so that the plate extends away from the vessel at an upward incline and the lower front edge of the plate overhangs the rim of the vessel, and an upstanding flange about the sides and back of the plate; the central portion of the plate at the back being cut concave to substantially fit about the neck of a preserving jar and the corresponding portion of the flange being similarly concave.

2. A drip tray comprising a generally rectangular bottom plate, a spring clip unit mounted on and depending from the plate to engage over the vertical wall of and support the tray from a cooking vessel, the unit being arranged so that the plate extends away from the vessel at an upward incline and the lower front edge of the plate overhangs the rim of the vessel, and an upstanding flange about the sides and back of the plate; the spring unit comprising transversely spaced fingers rigid with and bent down from the plate to engage the vessel on the inside and spring strips depending from the plate a predetermined distance back of and alined with the fingers, and sloping downwardly toward the lower portion of the fingers to cooperate therewith to clamp the wall of the vessel between the fingers and strips.

MARIEL L. CHANNELL.

REFERENCES CITED

The following references are of record in the file of this patent:

UNITED STATES PATENTS

| Number | Name | Date |
| --- | --- | --- |
| 242,398 | Trout | May 31, 1881 |
| 1,186,148 | Tenney | June 6, 1916 |